Patented Jan. 17, 1933

1,894,626

UNITED STATES PATENT OFFICE

JAMES P. A. McCOY, OF MILWAUKEE, WISCONSIN

VARNISH-LIKE MATERIAL AND METHOD OF PRODUCING THE SAME

No Drawing. Application filed September 24, 1920, Serial No. 412,542. Renewed June 26, 1930.

This invention relates to means for and the method of forming varnish-like coatings upon objects, and it has particular relation to the composition of a varnish-like material and the method of producing the desired varnish-like coating.

In accordance with the ordinary process of producing a varnish-like coating upon an object, there is great danger of having the varnish film applied unevenly, leaving a streaked appearance of the surface. Furthermore, due to some extent to the fact that a considerable period of time is required for the ordinary varnish coating to dry properly, such drying being ordinarily by surface oxidation, it is difficult to protect the varnish film from dust and other adventitious matter which collects upon and is held by the film. In any case, the result is quite liable to be a rough or uneven surface on the varnish film which must be rubbed smooth in order that it may present a satisfactory final appearance, either as the finished surface itself or as a base for a subsequent coating. These and other factors contribute to make it quite difficult, at least for anyone other than a person of considerable skill, to produce a finished varnish-like coating that is of satisfactory appearance.

In accordance with general features of the present invention, a varnish-like material is produced having such characteristics that even a comparatively inexperienced person can readily apply it to an object to be coated. One feature of the new varnish is that its inherent tackiness is considerably less than that of ordinary varnishes, so much so, in fact, that it can be readily applied in a satisfactory manner by means of a cloth or fabric pad. Again, the composition of the varnish is such that complete drying thereof is effected in a fraction of the time required for the proper drying of ordinary varnish which usually depends mainly upon surface oxidation; and the reactions and effects produced during drying are such as to cause foreign matter to be floated or carried to the surface of the varnish film where such foreign matter acts as a protective covering for the varnish film against adventitious matter during drying of the film.

It is an object of the present invention to provide a novel material which may be readily applied to objects to produce thereon a finished varnish-like coating.

It is a further object of this invention to provide an improved varnish-like material which, in drying in the form of a coating film, carries to the surface of the film foreign matter incapable of entering into the drying reaction.

It is a further object of this invention to provide an improved varnish-like material which when applied in the form of a coating film to the surface of an object, protects the final varnish film against the entrance thereto of adventitious material.

It is a further object of this invention to provide an improved method of producing a varnish-like material, and of producing a finished coating therefrom upon objects.

These and other objects and advantages are attained by this invention, various novel features of which will appear from the description herein, disclosing an embodiment of the invention, and will be particularly pointed out in the claims.

In preparing varnish-like material in accordance with principles of this invention, an oil, preferably a polymerizable vegetable oil, such as China wood oil, sometimes known as tung oil, which expands or increases in volume on polymerization, is treated with a drier or driers until a mixture is produced which dries with great rapidity. The drier used may be any of the well known driers, such as metallic driers like cobalt, lead or manganese drier, or a mixture of several of these driers. The actual proportions of drier and polymerizable oil may depend upon the intended use of the varnish product and the desired durability of the varnish film or the time of drying thereof, and also the actual materials used.

To this mixture of oil and drier are added the usual varnish gums, resins, pitches or asphaltic bodies, the particular nature and amount thereof depending upon the desired or contemplated use of the final varnish product. The required amount of solvent is then added. This solvent may be any of the ordinary ones used for this general purpose. It may be a coal tar derivative or turpentine or naphtha; and the amount of solvent may depend upon the desired consistency or fluidity at which it is desired to apply the final varnish product.

To this latter mixture including the solvent is added what may be termed an expellant material which may be almost any mineral oil, such as what is termed light machine oil, any non-drying oil of the vegetable series, or an animal oil, such as lard. The essential requirements of this expellant material are that it be greasy and substantially non-oxidizable or non-drying, and substantially nonentrant into the drying reaction of the varnish film. While this expellant material is applied with the mixture which forms the final hardened varnish film, nevertheless, during the drying reaction, particularly later stages thereof, of the varnish film, this expellant material, or a substantial portion thereof, is floated or forced to the surface of the varnish film. The amount of this expellant material is determined to a great extent by different requirements, but greatly by the character of the varnish gum used. The amount should preferably be sufficient to appreciably decrease the inherent tackiness of the varnish product, thus making it more readily capable of being properly applied to a surface, and also sufficient to cause appreciable physical agitation of the varnish film as the expellent is forced out or exuded from the film during the drying reaction thereof, this agitation resulting in an evening or smoothing of the varnish film. On the other hand, the amount of this expellant material should not be so great as to unduly hinder or delay the drying action, that is, there may be limitations as to the amount of expellent that the drying action can properly force through or exude from the surface of the final varnish film.

In producing a satisfactory coach varnish, or one quite satisfactory for interior woodwork or metal, a mixture containing about 95% (by weight) of raw China wood oil and about 5% of drier of the character mentioned above gives good results. To this mixture of China wood oil and drier may be added an amount of varnish gum, such as kauri gum, equal to 25% of the mixture of oil and drier. This combination of oil, drier and varnish gum is thinned with a solvent, such as naphtha or turpentine, to a suitable consistency, say about .870 or .880; and to this is added an expellent, such as light machine oil, in an amount equal to 10% of the thinned mixture. The ingredients are thoroughly mixed as added.

The product obtained as above described may be applied to a surface to be coated by means of a brush or a fabric pad. The great degree of care required in applying the ordinary varnish is not required with this special product. In the drying of the applied varnish-like coating, the solvent first passes off from the coating film, after which, or possibly at the same time, the drying reaction proper begins. This drying reaction is substantially or mainly one of polymerization of the China wood oil. During this drying reaction or polymerization, particularly later stages thereof, of the China wood oil, the light machine oil which constitutes the greasy expellent of the varnish is floated, forced or exuded to the surface of the film, carrying, or tending to carry, with it in its passage to the surface any dirt or other foreign matter on the surface of the object to which the varnish is applied and also any foreign matter, such as lint from the applying pad, etc., that might be included in fluid varnish.

The general effect produced a short time after the varnish is applied is that the greasy material of the varnish, which is incapable of entering into the drying reaction to any appreciable or substantial extent, appears as a greasy film upon the surface of the varnish coating, and this greasy film acts as a protective film against the entrance of dirt or other adventitious matter to the final varnish coating. Due to the fact that the drying reaction is substantially one of polymerization of the China wood oil, effective drying of the varnish coating proper occurs readily beneath the greasy film on the surface. The forces exerted during the drying reaction are such as to cause evening or smoothing of the surface of the varnish film proper. When the varnish coating beneath the greasy film is thoroughly dry, this greasy film may be cleaned from the surface, leaving the desired finished varnish-like coating.

It should be understood that it is not desired that the invention claimed be limited to the exact details as to materials, quantities thereof, and process steps described herein, for obvious modifications will be apparent to one skilled in the art.

It is claimed and desired to secure by Letters Patent:

1. A material for producing a varnish-like coating film on objects, containing a substantial proportion of tung oil, and a substantially non-oxidizable substance of a greasy nature, the resulting coating film setting substantially through polymerization of said tung oil.

2. A material for producing a varnish-like coating film on objects, containing a substantial proportion of tung oil, and a substance of a greasy nature which is substantially inactive in the setting of the coating film.

3. A varnish-like material containing China wood oil, a drier, a varnish gum and a mineral oil which is non-entrant into the drying action of a film of said material and expellable to the surface of said film during drying of the film, the drying reaction of the varnish film being mainly one of polymerization of said China wood oil.

4. A varnish capable of producing a hardened coating film and containing China wood oil, a drier, a substance having the characteristics of a varnish gum, said China wood oil being present in greater amount than said varnish gum and drier, and a material of a greasy nature mixed with said varnish and non-entrant into the drying reaction of said varnish, the drying reaction of said varnish being mainly one of polymerization of said China wood oil.

5. A varnish-like material containing a mixture including a substance which is polymerizable at temperatures under 150° C., and a substance of a greasy nature incapable of entering to a substantial degree into the drying reaction of a film of the varnish, a film of said varnish hardening mainly through polymerization of said polymerizable substance.

6. A varnish containing a substantial proportion of an oil which is polymerizable at temperatures under 150° C., and a substantially non-oxidizable, greasy substance, and hardening in the form of a coating film mainly through polymerization of said oil.

7. A varnish containing China wood oil, and a substantially non-oxidizable substance of a greasy nature, said latter substance being substantially non-entrant into the drying or hardening reaction of a film of the varnish and expellable to the surface of said film after application thereof.

8. A varnish-like material comprising a mixture containing an oil which is polymerizable at temperatures under 150° C., a drier, a varnish gum or the equivalent thereof, said polymerizable oil being present in an amount equal to at least 40 percent of the varnish-like material, a solvent, and a substantially non-drying substance of a greasy nature, a film of said material drying mainly through polymerization of said oil, and said greasy substance being substantially non-entrant into the composition of a hardened film of the varnish-like material.

9. A varnish containing China wood oil in a substantial amount and a material of a greasy nature substantially non-entrant into the drying reaction of the varnish and expellable to the surface of a film of the varnish during such drying thereof, said material of a greasy nature being one of a group of substances classed as animal and mineral oils.

10. A varnish self-hardening in the form of a film, and containing raw China wood oil in an amount equal to 50 percent by weight of the varnish exclusive of the solvent, said solvent, and a substantially non-oxidizable, greasy material substantially non-entrant into the drying or hardening reaction of the varnish and automatically expellable to the surface of a film of the varnish during hardening thereof at temperatures under 100° C. and removable from the film after hardening thereof without injury thereto.

11. A composition for producing a varnish-like coating film on objects, comprising a mixture containing an oil which is polymerizable at temperatures under 125° C. which increases in volume during polymerization, said oil being present in an amount equal to at least 35 percent by weight of said composition, and a substantially non-oxidizable substance of a greasy nature automatically expellable to the surface of the film during hardening thereof.

12. The method of producing a varnish-like material drying mainly through polymerization of an ingredient which comprises preparing a mixture containing a substance which is polymerizable at temperatures below 100° C. and a varnish gum or its equivalent, and mixing therewith a substantially non-oxidizable, greasy substance which is one of a group of substances classed as animal and mineral oils and which is substantially non-entrant into the composition of the hardened film of the varnish-like material.

13. The method of producing a varnish-like material drying at temperatures below 125° C. mainly through polymerization of an oil ingredient, which comprises preparing a mixture containing raw China wood oil, a varnish gum, a dryer, and a thinning medium, said China wood oil being present in an amount equal to at least 50 percent by weight of the material exclusive of said thinning medium, and a substantially non-oxidizable, greasy substance equal to about 10 percent of the thinned material and which is substantially non-entrant into the composition of a hardened film of the varnish material and is expellable from the body of the film and to the surface thereof subsequent to application of said film.

In testimony whereof I affix my signature.

JAMES P. A. McCOY.